(12) United States Patent
Tiao et al.

(10) Patent No.: US 8,496,368 B2
(45) Date of Patent: Jul. 30, 2013

(54) LIGHT GUIDE PLATE AND BACKLIGHT MODULE

(75) Inventors: Kuo-Tung Tiao, Hsin-Chu (TW); Hung-Sheng Huang, Hsin-Chu (TW); Han-Wen Tsai, Hsin-Chu (TW)

(73) Assignee: Coretronic Corporation (TW)

(*) Notice: Subject to any disclaimer, the term of this patent is extended or adjusted under 35 U.S.C. 154(b) by 274 days.

(21) Appl. No.: 12/908,962

(22) Filed: Oct. 21, 2010

(65) Prior Publication Data

US 2011/0096567 A1 Apr. 28, 2011

(30) Foreign Application Priority Data

Oct. 28, 2009 (TW) .............................. 98136503 A

(51) Int. Cl.
*F21V 7/04* (2006.01)

(52) U.S. Cl.
USPC ............ 362/607; 362/615; 362/617; 362/620

(58) Field of Classification Search
USPC .................................. 362/607, 615, 617, 620
See application file for complete search history.

(56) References Cited

U.S. PATENT DOCUMENTS

| | | | |
|---|---|---|---|
| 7,448,786 B2 | 11/2008 | Yue | |
| 2004/0141108 A1 | 7/2004 | Tanaka et al. | |
| 2004/0228109 A1* | 11/2004 | Leu et al. | 362/31 |
| 2004/0263717 A1* | 12/2004 | Hsu et al. | 349/62 |
| 2005/0190579 A1* | 9/2005 | Lin | 362/618 |
| 2006/0291065 A1 | 12/2006 | Hasei et al. | |
| 2007/0025121 A1* | 2/2007 | Harada et al. | 362/607 |
| 2009/0021958 A1* | 1/2009 | Chang | 362/607 |
| 2009/0279324 A1* | 11/2009 | Chen et al. | 362/616 |

FOREIGN PATENT DOCUMENTS

| | | |
|---|---|---|
| TW | 200527016 | 8/2005 |
| TW | 1287135 | 9/2007 |
| TW | 200732785 | 9/2007 |
| TW | 200804924 | 1/2008 |

OTHER PUBLICATIONS

Taiwanese Office Action dated Mar. 29, 2013 issued in the corresponding Taiwanese Patent Application; 7 pages.

\* cited by examiner

*Primary Examiner* — Evan Dzierzynski
(74) *Attorney, Agent, or Firm* — MH2 Technology Law Group LLP

(57) ABSTRACT

A light guide plate is adapted for a backlight module having at least one light emitting device, and the light guide plate includes a light emitting surface, a surface opposite to the light emitting surface, a light incident surface connected with the light emitting surface and the surface, and a plurality of microstructures disposed on the light emitting surface or the surface. 90 percent or more of the surface or the light emitting surface is flat. At least one of the light emitting devices is disposed beside the light incident surface and capable of emitting a light beam. The light incident surface is capable of making the light beam enter the light guide plate and the light emitting surface is capable of making the light beam transmit outside the light guide plate. A backlight module is also provided.

23 Claims, 6 Drawing Sheets

LIGHT GUIDE PLATE AND BACKLIGHT MODULE

CROSS-REFERENCE TO RELATED APPLICATION

This application claims the priority benefit of Taiwan application serial no. 98136503, filed on Oct. 28, 2009. The entirety of the above-mentioned patent application is hereby incorporated by reference herein and made a part of this specification.

BACKGROUND OF THE INVENTION

1. Field of the Invention

The invention generally relates to an optical device, and more particularly, to a light guide plate and a backlight module.

2. Description of Related Art

A backlight module usually includes a light guide plate, and the light guide plate guides the scatter direction of a light beam emitted by a light source to improve the brilliance of a panel and to insure the brightness uniformity of the panel, so as to convert a point light source or a line light source of the backlight module into a surface light source for a liquid crystal display panel. Therefore, the material properties of the light guide plate, the design and manufacture of the surface scatter pattern all relate to the entire optical design of the backlight module and the control of the brilliance and uniformity. Generally, the light guide plate includes a plurality of dots to destroy the total reflection for the light beam transmitting outside the backlight module. With the design of the dots, the light guide plate may emit the light beam uniformly.

Screen printing is a conventional process to make dots, and the disadvantage of the conventional process is that the diameters of the dots are limited by process technology so that it is hard to form small dots (e.g. the diameter of dots is hard to be less than 100 microns). Thus the thickness of the light guide plate may be limited, and if the light guide plate is too thin, the light guide plate may not be used because the user is easy aware of the flaw and the shape of dots. With the tendency towards the thin light guide plate, the inkjet technology used in making dots is disclosed. For example, Taiwan patent publication No. 1287135 discloses a display device, the display device includes a light guide plate having a plurality of microstructures and a reflector, wherein the microstructures are made on a side of the reflector adjacent to the light guide plate by using the inkjet technology.

In other hand, Taiwan patent application No. 200732785. discloses a method of making microstructures in the light guide plate by inkjet, wherein a number density of the microstructures adjacent to a light emitting surface of the light plate is smaller than a number density of the microstructures away from the light emitting surface of the light guide plate. Additionally, Taiwan patent application No. 200804924 discloses a direct type backlight module. The backlight module includes a plurality of curved light-uniformed elements and a plurality of light sources, wherein the light-uniformed element is similar to a diffusion sheet, and the light-uniformed element is aligned with a light source. Besides, US patent application No. 20060291065 discloses a micro lens, and an array of lenses foamed on a base sheet for deflecting a light beam.

SUMMARY OF THE INVENTION

Accordingly, the invention is directed to a light guide plate able to improve the use efficiency of light.

The invention is also directed to a backlight module able to improve the use efficiency of light.

Other advantages of the invention should be further indicated by the disclosures of the invention, and omitted herein for simplicity.

To achieve one of, a part of or all of the above-mentioned advantages or to achieve other advantages, an embodiment of the invention provides a light guide plate, adapted to a backlight module including at least one light emitting device. The light guide plate includes a light emitting surface, a surface opposite to the light emitting surface, a light incident surface connected with the light emitting surface and the surface, and a plurality of microstructures disposed on the light emitting surface. Herein, 90 percent or more of the surface is flat, the at least one light emitting device is disposed beside the light incident surface capable of emitting a light beam, the light incident surface is capable of making the light beam enter the light guide plate, and the light emitting surface is capable of making the light beam transmit outside the light guide plate. Additionally, the microstructures include protruding dots and a ratio of a height of the protruding dots in a direction perpendicular to the light emitting surface to a width of the protruding dots in a direction parallel to the light emitting surface is between 0.1 and 0.5.

Another embodiment of the invention provides a light guide plate adapted to a backlight module including at least one light emitting device. The light guide plate includes a light emitting surface, a surface opposite to the light emitting surface, a light incident surface connected with the light emitting surface and the surface, and a plurality of microstructures disposed on the surface. Herein 90 percent or more of the light emitting surface is flat, the at least one light emitting device is disposed beside the light incident surface capable of emitting a light beam, the light incident surface is capable of making the light beam enter the light guide plate, and the light emitting surface is capable of making the light beam transmit outside the light guide plate. Additionally, the microstructures include protruding dots, a ratio of a height of the protruding dots in a direction perpendicular to the light emitting surface to a width of the protruding dots in a direction parallel to the light emitting surface is between 0.1 and 0.5, and a plurality of diffusion particles distributed among the microstructures.

Another embodiment of the invention provides a backlight module including at least one light emitting device and a light guide plate. At least one light emitting device is capable of emitting a light beam. The light guide plate has a light emitting surface, a surface opposite to the light emitting surface, a light incident surface connected with the light emitting surface and the surface, and a plurality of microstructures disposed on the light emitting surface, wherein 90 percent or more of the surface is flat, the at least one light emitting device is disposed beside the light incident surface, the light incident surface is capable of making the light beam enter the light guide plate, and the light emitting surface is capable of making the light beam transmit outside the backlight module. Additionally, the microstructures include protruding dots and a ratio of a height of the protruding dots in a direction perpendicular to the light emitting surface to a width of the protruding dots in a direction parallel to the light emitting surface is between 0.1 and 0.5.

In an embodiment of the invention, the diameters of microstructures are between 30 micrometers and 80 micrometers. A number density of the microstructures adjacent to the light emitting device is smaller than a number density of the microstructures away from the light emitting device.

In an embodiment of the invention, the backlight module further includes a plurality of diffusion particles distributed among the microstructures. The diffusion particles, for example, are silicon dioxide or titanium dioxide. Additionally, the backlight module further includes a reflection unit disposed on the surface. Besides, the backlight module further includes an optical film disposed on the light emitting surface. The optical film includes at least one of a diffusion plate, a brightness enhancement film, and a prism sheet.

Base on the above, in the embodiment of the invention, the plurality of microstructures include protruding dots, a ratio of a height of the protruding dots in a direction perpendicular to the light emitting surface to a width of the protruding dots in a direction parallel to the light emitting surface is between 0.1 and 0.5, so that the use efficiency of the light beam may be improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment

Figure 1:
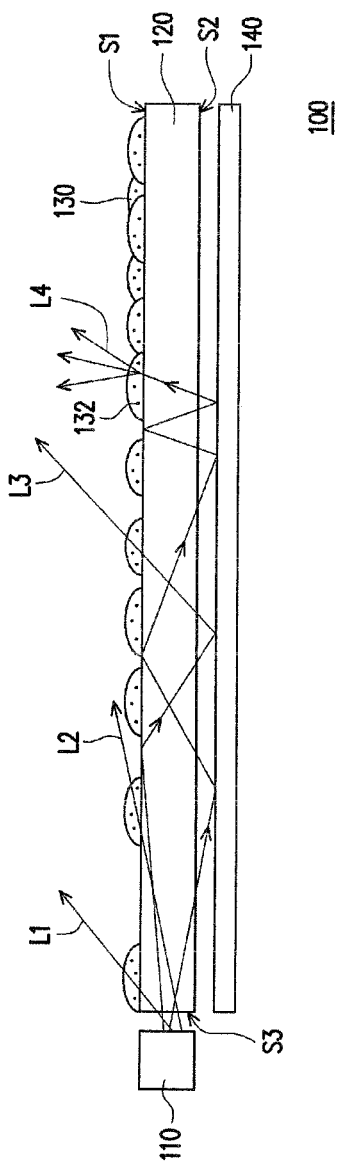
FIG. 1 is a cross-sectional view of a backlight module 100 of the first embodiment.
Figure 2:
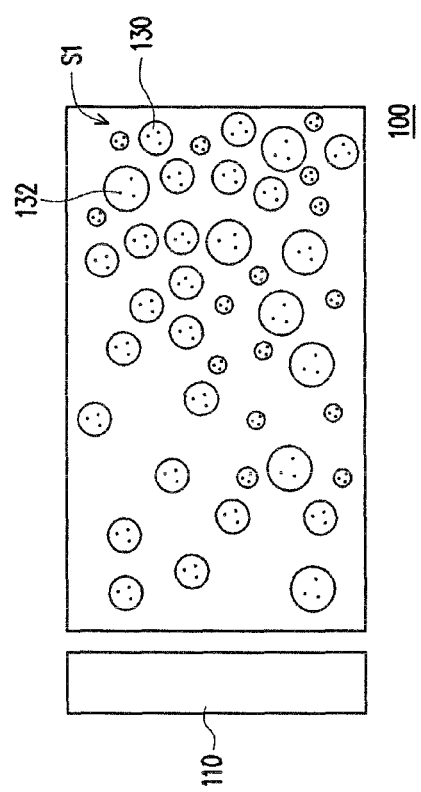
FIG. 2 is a top view of the backlight module 100 in FIG. 1.

Referring to FIGS. 1 and 2, a backlight module 100 includes at least one light emitting device 110, a light guide plate 120, and a plurality of microstructures 130. The light emitting device 110 is capable of emitting a light beam (such as a light beam L1). The light emitting 110 is, for example, a cold cathode fluorescent lamp (CCFL) or a light emitting diode (LED).

The light guide plate 120 includes a light emitting surface S1, a surface S2 opposite to the light emitting surface 51, and a light incident surface S3 connected with the light emitting surface S1 and the surface S2, wherein 90 percent or more of the surface S2 is flat. The light guide plate 120 is capable of guiding the light beam (such as the light beam L1). The light emitting device 110 is disposed beside the light incident surface 53, the light incident surface S3 is capable of making the light beam L1 enter the light guide plate 120, and the light emitting surface S1 is capable of making the light beam L1 transmit outside the backlight module 100.

Referring to FIGS. 1 and 2, the microstructures 130 are disposed on the light emitting surface S1 with different interval from each other. In detailed, a number density of the microstructures 130 adjacent to the light emitting device 110 is smaller than a number density of the microstructures 130 away from the light emitting device 110. Additionally, the size and shape of the microstructure 130 in the same light emitting surface S1 may be different from or similar to one another (as shown in FIG. 2). In other words, the size, shape, and position of the microstructure 130 may be designed by request, but not limited to it. Besides, the backlight module in the embodiment further includes a reflection unit 140, and the reflection unit 140 is disposed on the surface S2 of the light guide plate. The reflection unit 140, for example, is a reflection sheet or a reflection film, and the reflection sheet, for example, is a white reflection sheet or a silver reflection sheet. The reflection unit 140 may improve the brilliance of a display device (not shown).

It should be noted that, the microstructures 130 are disposed on the light emitting surface S1 away from the reflection unit 140, so that the light beam (such as the light beams L1 and L2) may have a chance to directly pass through the light guide plate 120. Thus, the transmission distance of the light beam (such as the light beams L1 and L2) may be reduced, and the probability of the light beam absorbed by the light guide plate is reduced. Then the use efficiency of the backlight module is improved, so that the backlight module may provide a surface light source with a high brightness.

Generally, the light guide plate is made of transparent material such as polymethyl methacrylate (PMMA) or polycarbonate (PC). Because the aforementioned material has a low transmission rate for a blue light beam, when the light beam transmits too far or is reflected many times, the light beam passing through the backlight module may become yellow, so as to affect the quality of the image. However, in the embodiment, the light beam (such as the light beams L1 and L2) may directly pass through the microstructures 130 of the light emitting surface S1 and transmit outside the backlight module 100, further the transmission distance and the reflective times of the light beam (such as the light beams L1 and L2) are reduced. With the transmission distance and the reflective times of the light beam are reduced, the probability of the blue light beam absorbed by the light guide plate is reduced as well, so that the quality of the image is improved.

In other hand, the light beam (such as the light beam L3) emitted by the light emitting device 110 may be reflected to the light emitting surface S1 by the reflection unit 140 after the light beam is total reflected in the light guide plate for several times. When the light beam L3 transmits to the microstructures 130 of the light emitting surface S1, the microstructures may destroy the total reflection, so that the light beam may directly pass through the light emitting surface S1 and transmit outside of the backlight module 100.

Besides, referring to FIG. 1 and FIG. 2, the backlight module 100 further includes a plurality of diffusion particles 132 distributed among the microstructures 130. The diffusion particles 132 are, for example, silicon dioxide ($SiO_2$) or titanium dioxide ($TiO_2$). With the diffusion particles 132, it is benefit for scattering the light beam (such as the light beam L4) and increasing uniformity of the light. It is should noted that, in other embodiment, the microstructures 130 may not have the diffusion particles 132.

Figure 3:
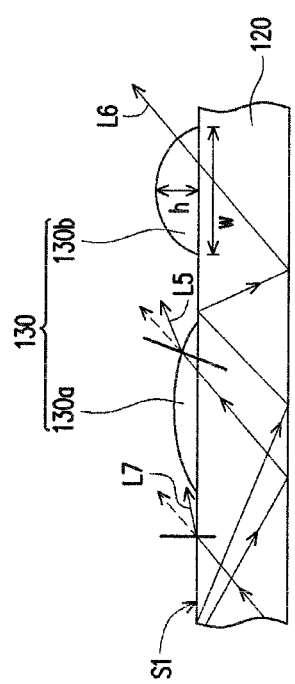
FIG. 3 is an enlargement view of microstructures 130 and a part of light guide plate 120 in FIG. 1.

Referring to FIG. 3, the microstructures 130a having a higher height at the central may make an emitting angle of the light beam L5 further deflect to the normal line respect to the emitting angle of the light beam L7 due to the incline of a surface of the microstructures. In other hand, the light beam L6 may directly transmit outside of the backlight module through the microstructures 130b without deflecting if the microstructures 130b are tall enough and the inclined surface angle is big enough. The emitting angle of the light beam (such as the light beams L5~L6) at the light emitting surface S1 may be adjusted by controlling the inclined surface angle of the microstructures 130, so as to adjust the uniformity in part area of the light field upon the light guide plate 120.

Besides, in the embodiment, the microstructures 130 are, for example, protruding dots 132 that may be made by inkjet for manufacturing tiny microstructures, so as to benefit for the thin type of the backlight module 100. In the embodiment, diameters of the microstructures are between 30 micrometers and 80 micrometers. Because a volume of the microstructure 130 is less than a volume of a conventional dot, so it could overcome the shortage of a dot with bigger size in conventional technology. Additionally, a size of a protrusion dot is controlled by quantity of ink drops. By inkjet, the emitting angle of the light beam may be changed and the distribution of the light beam on the emitting light surface may be adjusted by controlling the distribution and the size of the microstructures 130. Controlling the distribution and the size of the microstructures through inkjet technology could also improve the problem of uneven image resulting from screen printing and benefits to manufacture a light-weight backlight module.

In the embodiment, a ratio of a height h of the protruding dots in a direction perpendicular to the light emitting surface S1 to a width w of the protruding dots in a direction parallel to the light emitting surface S1 is between 0.1 and 0.5. As above mentioned, the traveling direction of the light beam is controlled by adjusting the ratio of the height to the width of the protruding dots for modifying the light flied distribution of the partial area of the light emitting surface S1. By doing so, the backlight module 100 may provide a uniform surface light source.

The Second Embodiment

Figure 4:
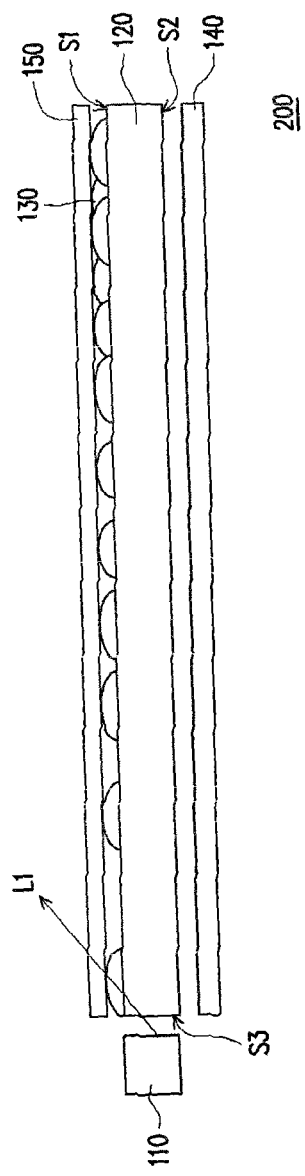
FIG. 4 is a cross-sectional view of a backlight module 200 of the second embodiment.

Referring to FIG. 4, the backlight module 200 is similar to the backlight module 100, and the difference between the two backlight modules 200 and 100 is described as follows. The backlight module 200 further includes an optical film 150 disposed on the light emitting surface S1. Besides, the backlight module 200 of the embodiment may not include diffusion particles 132 as shown in FIG. 1. In the embodiment, the optical film 150 is at least one of a diffusion plate, a brightness enhancement film, and a prism sheet, and the optical film 150 may design according to the demand. The function of the optical film 150 is to make the transmissive light beam (such as L1) more uniform and to increase forward brilliance of the backlight module. Beside, the optical film 150 upon the light guide plate 120 may effectively cover the distribution image if the microstructures 130 are small enough or distribution density is high enough.

The Third Embodiment

Figure 5:
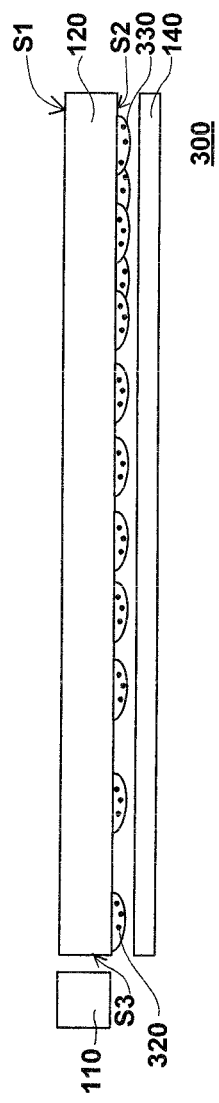
FIG. 5 is a cross-sectional view of a backlight module 300 of the third embodiment.
Figure 6:
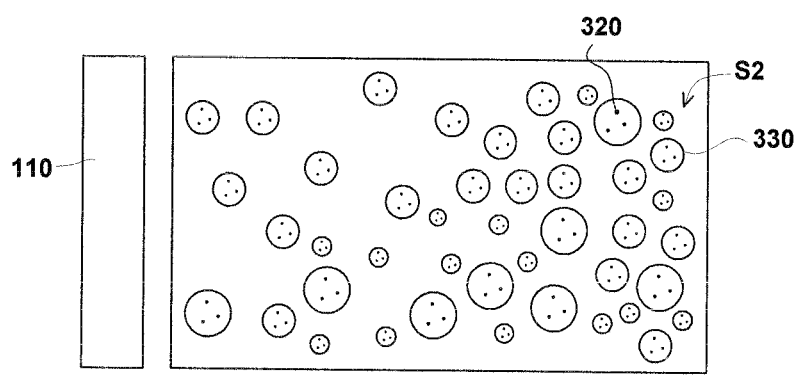
FIG. 6 is a top view of the backlight module 300 in FIG. 5.

Referring to FIGS. 5 and 6, a backlight module 300 in the embodiment is similar to the backlight module 100, similar elements have the same symbols, and the details of them are omitted here. The difference between the two backlight modules 300 and 100 is described as follows. The microstructures 330 are disposed on the surface S2 rather than the light emitting surface S1 and 90 percent or more of the light emitting surface S1 is flat. Moreover, the microstructures 330 are, for example, protruding dots, that may be made by inkjet, a ratio of a height of the protruding dots in a direction perpendicular to the surface S2 to a width of the protruding dots in a direction parallel to the light surface S2 is between 0.1 and 0.5, and a plurality of diffusion particles 320 distributed among the microstructures 330.

Similarly to the backlight module 100, diameters of the microstructures 330 in the embodiment are between 30 micrometers and 80 micrometers and a number density of the microstructures 330 adjacent to the light emitting device 110 is smaller than a number density of the microstructures 330 away from the light emitting device 110. Additionally, the size and shape of the microstructures 330 on the surface S2 may be different from or similar to one another (as shown in FIG. 6) and are controlled by quantity of ink drops. By inkjet, the emitting angle of the light beam may be changed and the distribution of the light beam on the emitting light surface S1 may be adjusted. Moreover, the diffusion particles 320 are, for example, silicon dioxide ($SiO_2$) or titanium dioxide ($TiO_2$). With the diffusion particles 332, it is benefit for scattering the light beam (such as the light beam L4) and increasing uniformity of the light and thus the use efficiency of the backlight module 300 is improved, so that the backlight module 300 may provide a surface light source with a high brightness.

Besides, the backlight module 300 in the embodiment further includes a reflection unit 140 as shown in FIG. 1 and the reflection unit 140 may improve the brilliance of display device (not shown). Otherwise, the backlight module 300 may further include an optical film (not shown) disposed on the light emitting surface S1. The optical film could be at least one of a diffusion plate, a brightness enhancement film, and a prism sheet.

To sum up, in the embodiment, because the microstructures, disposed on the light emitting surface or the surface of the light guide plate, include protruding dots and a ratio of a height of the protruding dots in a direction perpendicular to the light emitting surface to a width of the protruding dots in a direction parallel to the light emitting surface is between 0.1 and 0.5, so the use efficiency of the light beam may be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light guide plate, adapted to a backlight module, the backlight module comprising at least one light emitting device capable of emitting a light beam, the light guide plate comprising:
    a light emitting surface;
    a surface opposite to the light emitting surface;
    a light incident surface connected with the light emitting surface and the surface, wherein 90 percent or more of the surface is flat, the at least one light emitting device is disposed beside the light incident surface, the light incident surface is capable of making the light beam enter the light guide plate, and the light emitting surface is capable of making the light beam transmit outside the light guide plate; and
    a plurality of microstructures disposed on the light emitting surface, wherein the microstructures comprise protruding dots and a ratio of a height of the protruding dots in a direction perpendicular to the light emitting surface to a width of the protruding dots in a direction parallel to the light emitting surface is between 0.1 and 0.5.

2. The light guide plate according to claim 1, wherein diameters of the microstructures are between 30 micrometers and 80 micrometers.

3. The light guide plate according to claim 1, wherein a number density of the microstructures adjacent to the light emitting device is smaller than a number density of the microstructures away from the light emitting device.

4. The light guide plate according to claim 1, further comprising a plurality of diffusion particles distributed among the microstructures.

5. The light guide plate according to claim 4, wherein the diffusion particles are silicon dioxide ($SiO_2$) or titanium dioxide ($TiO_2$).

6. A light guide plate, adapted to a backlight module, the backlight module comprising at least one light emitting device capable of emitting a light beam, the light guide plate comprising:
    a light emitting surface;
    a surface opposite to the light emitting surface;
    a light incident surface connected with the light emitting surface and the surface, wherein 90 percent or more of the light emitting surface is flat, the at least one light emitting device is disposed beside the light incident surface, the light incident surface is capable of making the light beam enter the light guide plate, and the light emitting surface is capable of making the light beam transmit outside the light guide plate; and
    a plurality of microstructures disposed on the surface, wherein the microstructures comprise protruding dots, a ratio of a height of the protruding dots in a direction perpendicular to the surface to a width of the protruding dots in a direction parallel to the surface is between 0.1 and 0.5, and a plurality of diffusion particles distributed among the microstructures.

7. The light guide plate according to claim 6, wherein diameters of the microstructures are between 30 micrometers and 80 micrometers.

8. The light guide plate according to claim 6, wherein a number density of the microstructures adjacent to the light emitting device is smaller than a number density of the microstructures away from the light emitting device.

9. The light guide plate according to claim 6, wherein the diffusion particles are silicon dioxide ($SiO_2$) or titanium dioxide ($TiO_2$).

10. A backlight module, comprising:
    at least one light emitting device capable of emitting a light beam; and
    a light guide plate having a light emitting surface, a surface opposite to the light emitting surface, a light incident surface connected with the light emitting surface and the surface, and a plurality of microstructures disposed on the light emitting surface, wherein 90 percent or more of the surface is flat, the at least one light emitting device is disposed beside the light incident surface, the light incident surface is capable of making the light beam enter the light guide plate, and the light emitting surface is capable of making the light beam transmit outside the backlight module;
    wherein the microstructures comprise protruding dots and a ratio of a height of the protruding dots in a direction perpendicular to the light emitting surface to a width of the protruding dots in a direction parallel to the light emitting surface is between 0.1 and 0.5.

11. The backlight module according to claim 10, wherein diameters of the microstructures are between 30 micrometers and 80 micrometers.

12. The backlight module according to claim 10, wherein a number density of the microstructures adjacent to the light emitting device is smaller than a number density of the microstructures away from the light emitting device.

13. The backlight module according to claim 10, further comprising a plurality of diffusion particles distributed among the microstructures.

14. The backlight module according to claim 13, wherein the diffusion particles are silicon dioxide or titanium dioxide.

15. The backlight module according to claim 10, further comprising a reflection unit disposed on the surface.

16. The backlight module according to claim 10, further comprising an optical film disposed on the light emitting surface.

17. The backlight module according to claim 16, wherein the optical film comprises at least one of a diffusion plate, a brightness enhancement film, and a prism sheet.

18. A backlight module, comprising:
at least one light emitting device capable of emitting a light beam; and
a light guide plate having a light emitting surface, a surface opposite to the light emitting surface, a light incident surface connected with the light emitting surface and the surface, and a plurality of microstructures disposed on the surface, wherein 90 percent or more of the light emitting surface is flat, the at least one light emitting device is disposed beside the light incident surface, the light incident surface is capable of making the light beam enter the light guide plate, and the light emitting surface is capable of making the light beam transmit outside the light guide plate;
wherein the microstructures comprise protruding dots, a ratio of a height of the protruding dots in a direction perpendicular to the surface to a width of the protruding dots in a direction parallel to the surface is between 0.1 and 0.5, and a plurality of diffusion particles distributed among the microstructures.

19. The back light module according to claim 18, wherein diameters of the microstructures are between 30 micrometers and 80 micrometers.

20. The backlight module according to claim 18, wherein a number density of the microstructures adjacent to the light emitting device is smaller than a number density of the microstructures away from the light emitting device.

21. The backlight module according to claim 18, wherein the diffusion particles are silicon dioxide ($SiO_2$) or titanium dioxide ($TiO_2$).

22. The backlight module according to claim 18, further comprising an optical film disposed on the light emitting surface.

23. The backlight module according to claim 18, wherein the optical film comprises at least one of a diffusion plate, a brightness enhancement film, and a prism sheet.

* * * * *